(12) United States Patent
Modeland (10) Patent No.: US 9,796,918 B2
(45) Date of Patent: Oct. 24, 2017

(54) WELLBORE SERVICING FLUIDS AND METHODS OF MAKING AND USING SAME

(71) Applicant: Halliburton Energy Services, Inc., Houston, TX (US)

(72) Inventor: Neil Joseph Modeland, Gladewater, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 432 days.

(21) Appl. No.: 13/754,397

(22) Filed: Jan. 30, 2013

(65) Prior Publication Data
US 2014/0209309 A1   Jul. 31, 2014

(51) Int. Cl.
*E21B 43/267*   (2006.01)
*C09K 8/90*   (2006.01)
(Continued)

(52) U.S. Cl.
CPC ............... *C09K 8/90* (2013.01); *C09K 8/685* (2013.01); *C09K 8/80* (2013.01); *C09K 8/887* (2013.01); *E21B 43/267* (2013.01)

(58) Field of Classification Search
None
See application file for complete search history.

(56) References Cited

U.S. PATENT DOCUMENTS 2,050,970 A   8/1936   Hughes
2,312,018 A   2/1943   Beckman
(Continued)

FOREIGN PATENT DOCUMENTS

CA   2734351 A1   2/2010
WO   03072907 A1   9/2003
(Continued)

OTHER PUBLICATIONS

Burke, et al. Improved Hydraulic Fracture Performance withEnergized Fluids; A Montney Example. 2011. Recovery CSPG CSEG Owls Convention.*

(Continued)

*Primary Examiner* — Angela M DiTrani
(74) *Attorney, Agent, or Firm* — Craig W. Roddy; Baker Botts L.L.P.

(57) ABSTRACT

A method of servicing a wellbore within a subterranean formation comprising providing a first wellbore tubular positioned within a second wellbore tubular creating a tubular flowpath and an annular flowpath, wherein the tubular flowpath and the annular flowpath converge in a mixing zone within the wellbore, placing an annular fluid through the annular flowpath, placing a tubular fluid through the tubular flowpath, and contacting the annular fluid and the tubular fluid in the mixing zone to form a composite fluid, wherein the composite fluid comprises a base fluid component, a proppant component, a crosslinkable polymer component, a crosslinking agent component, and an optional buffering agent component and wherein the components of the composite fluid are apportioned between the annular fluid and the tubular fluid such that reaction of the components to form the composite fluid is inhibited until the components of the composite fluid mix within the mixing zone.

15 Claims, 3 Drawing Sheets

(51) Int. Cl.
*C09K 8/80* (2006.01)
*C09K 8/68* (2006.01)
*C09K 8/88* (2006.01)

(56) References Cited

U.S. PATENT DOCUMENTS

| | | | |
|---|---|---|---|
| 2,753,940 A | 7/1956 | Bonner | |
| 3,912,692 A | 10/1975 | Casey et al. | |
| 4,005,750 A | 2/1977 | Shuck | |
| 4,312,406 A | 1/1982 | McLaurin et al. | |
| 4,361,187 A * | 11/1982 | Luers | B01F 5/0413 137/860 |
| 4,387,769 A | 6/1983 | Erbstoesser et al. | |
| 4,509,598 A | 4/1985 | Earl et al. | |
| 4,515,214 A | 5/1985 | Fitch et al. | |
| 4,590,995 A | 5/1986 | Evans | |
| 4,662,447 A * | 5/1987 | Bolin | E21B 43/045 166/278 |
| 4,687,061 A | 8/1987 | Uhri | |
| 4,869,322 A | 9/1989 | Vogt, Jr. et al. | |
| 4,887,670 A | 12/1989 | Lord et al. | |
| 4,949,788 A | 8/1990 | Szarka et al. | |
| 5,074,360 A | 12/1991 | Guinn | |
| 5,111,881 A | 5/1992 | Soliman et al. | |
| 5,145,004 A | 9/1992 | Cornette | |
| 5,216,050 A | 6/1993 | Sinclair | |
| 5,241,475 A | 8/1993 | Lee et al. | |
| 5,318,123 A | 6/1994 | Venditto et al. | |
| 5,363,916 A * | 11/1994 | Himes | C09K 8/08 166/276 |
| 2,703,316 A | 3/1995 | Schneider | |
| 5,482,116 A | 1/1996 | El-Rabaa et al. | |
| 5,494,103 A | 2/1996 | Surjaatmadja et al. | |
| 5,499,678 A | 3/1996 | Surjaatmadja et al. | |
| 5,533,571 A | 7/1996 | Surjaatmadja et al. | |
| 5,547,023 A | 8/1996 | McDaniel et al. | |
| 5,595,245 A | 1/1997 | Scott, III | |
| 5,765,642 A | 6/1998 | Surjaatmadja | |
| 5,950,731 A * | 9/1999 | Shuchart et al. | 166/300 |
| 6,047,773 A | 4/2000 | Zeltmann et al. | |
| 6,230,805 B1 * | 5/2001 | Vercaemer et al. | 166/300 |
| 6,283,210 B1 | 9/2001 | Soliman et al. | |
| 6,323,307 B1 | 11/2001 | Bigg et al. | |
| 6,394,184 B2 | 5/2002 | Tolman et al. | |
| 6,401,815 B1 | 6/2002 | Surjaatmadja et al. | |
| 6,439,310 B1 * | 8/2002 | Scott et al. | 166/308.1 |
| 6,474,419 B2 | 11/2002 | Maier et al. | |
| 6,543,538 B2 | 4/2003 | Tolman et al. | |
| 6,565,129 B2 | 5/2003 | Surjaatmadja | |
| 6,662,874 B2 | 12/2003 | Surjaatmadja et al. | |
| 6,719,054 B2 | 4/2004 | Cheng et al. | |
| 6,725,933 B2 | 4/2004 | Middaugh et al. | |
| 6,779,607 B2 | 8/2004 | Middaugh et al. | |
| 6,805,199 B2 | 10/2004 | Surjaatmadja | |
| 6,837,523 B2 | 1/2005 | Surjaatmadja et al. | |
| 6,907,936 B2 | 6/2005 | Fehr et al. | |
| 6,938,690 B2 | 9/2005 | Surjaatmadja | |
| 7,032,671 B2 | 4/2006 | Aud | |
| 7,044,220 B2 | 5/2006 | Nguyen et al. | |
| 7,059,407 B2 | 6/2006 | Tolman et al. | |
| 7,066,265 B2 | 6/2006 | Surjaatmadja | |
| 7,090,153 B2 | 8/2006 | King et al. | |
| 7,096,954 B2 | 8/2006 | Weng et al. | |
| 7,100,688 B2 | 9/2006 | Stephenson et al. | |
| 7,108,064 B2 | 9/2006 | Hart et al. | |
| 7,108,067 B2 | 9/2006 | Themig et al. | |
| 7,150,327 B2 | 12/2006 | Surjaatmadja | |
| 7,152,677 B2 | 12/2006 | Parlar et al. | |
| 7,159,660 B2 | 1/2007 | Justus | |
| 7,225,869 B2 | 6/2007 | Willett et al. | |
| 7,228,908 B2 | 6/2007 | East, Jr. et al. | |
| 7,234,529 B2 | 6/2007 | Surjaatmadja | |
| 7,237,612 B2 | 7/2007 | Surjaatmadja et al. | |
| 7,243,723 B2 | 7/2007 | Surjaatmadja et al. | |
| 7,273,099 B2 | 9/2007 | East, Jr. et al. | |
| 7,273,313 B2 | 9/2007 | Surjaatmadja | |
| 7,278,486 B2 | 10/2007 | Alba et al. | |
| 7,281,581 B2 | 10/2007 | Nguyen et al. | |
| 7,287,592 B2 | 10/2007 | Surjaatmadja et al. | |
| 7,296,625 B2 | 11/2007 | East, Jr. | |
| 7,318,473 B2 | 1/2008 | East, Jr. et al. | |
| 7,322,417 B2 | 1/2008 | Rytlewski et al. | |
| 7,325,608 B2 | 2/2008 | van Batenburg et al. | |
| 7,337,844 B2 | 3/2008 | Surjaatmadja et al. | |
| 7,343,975 B2 | 3/2008 | Surjaatmadja et al. | |
| 7,370,701 B2 | 5/2008 | Surjaatmadja et al. | |
| 7,387,165 B2 | 6/2008 | Lopez de Cardenas et al. | |
| 7,398,825 B2 | 7/2008 | Nguyen et al. | |
| 7,429,332 B2 | 9/2008 | Surjaatmadja et al. | |
| 7,431,090 B2 | 10/2008 | Surjaatmadja et al. | |
| 7,445,045 B2 | 11/2008 | East, Jr. et al. | |
| 7,472,746 B2 | 1/2009 | Maier | |
| 7,478,020 B2 | 1/2009 | Guo et al. | |
| 7,478,676 B2 | 1/2009 | East, Jr. et al. | |
| 7,503,404 B2 | 3/2009 | McDaniel et al. | |
| 7,506,689 B2 | 3/2009 | Surjaatmadja et al. | |
| 7,520,327 B2 | 4/2009 | Surjaatmadja | |
| 7,543,635 B2 | 6/2009 | East et al. | |
| 7,571,766 B2 | 8/2009 | Pauls et al. | |
| 7,571,767 B2 | 8/2009 | Parker et al. | |
| 7,575,062 B2 | 8/2009 | East, Jr. | |
| 7,580,796 B2 | 8/2009 | Soliman et al. | |
| 7,595,281 B2 | 9/2009 | McDaniel et al. | |
| 7,610,959 B2 | 11/2009 | Surjaatmadja | |
| 7,617,871 B2 | 11/2009 | Surjaatmadja et al. | |
| 7,625,846 B2 | 12/2009 | Cooke, Jr. | |
| 7,647,964 B2 | 1/2010 | Akbar et al. | |
| 7,673,673 B2 | 3/2010 | Surjaatmadja et al. | |
| 7,681,645 B2 | 3/2010 | McMillin et al. | |
| 7,690,427 B2 | 4/2010 | Rispler | |
| 7,703,510 B2 | 4/2010 | Xu | |
| 7,711,487 B2 | 5/2010 | Surjaatmadja | |
| 7,723,264 B2 | 5/2010 | McDaniel et al. | |
| 7,726,403 B2 | 6/2010 | Surjaatmadja | |
| 7,730,951 B2 | 6/2010 | Surjaatmadja et al. | |
| 7,740,072 B2 | 6/2010 | Surjaatmadja | |
| 7,766,083 B2 | 8/2010 | Willett et al. | |
| 7,775,278 B2 | 8/2010 | Willberg et al. | |
| 7,775,285 B2 | 8/2010 | Surjaatmadja et al. | |
| 7,841,396 B2 | 11/2010 | Surjaatmadja | |
| 7,849,924 B2 | 12/2010 | Surjaatmadja et al. | |
| 7,861,788 B2 | 1/2011 | Tips et al. | |
| 7,870,907 B2 | 1/2011 | Lembcke et al. | |
| 7,874,365 B2 | 1/2011 | East, Jr. et al. | |
| 7,882,894 B2 | 2/2011 | Nguyen et al. | |
| 7,905,284 B2 | 3/2011 | Ross et al. | |
| 7,926,571 B2 | 4/2011 | Hofman | |
| 7,931,082 B2 | 4/2011 | Surjaatmadja | |
| 7,946,340 B2 | 5/2011 | Surjaatmadja et al. | |
| 7,963,331 B2 | 6/2011 | Surjaatmadja et al. | |
| 7,971,646 B2 | 7/2011 | Murray et al. | |
| 8,016,032 B2 | 9/2011 | Mandrell et al. | |
| 8,056,638 B2 | 11/2011 | Clayton et al. | |
| 8,061,426 B2 | 11/2011 | Surjaatmadja | |
| 8,066,068 B2 | 11/2011 | Lesko et al. | |
| 8,074,715 B2 | 12/2011 | Rispler et al. | |
| 8,079,933 B2 | 12/2011 | Kaminsky et al. | |
| 8,096,358 B2 | 1/2012 | Rispler et al. | |
| 8,104,535 B2 | 1/2012 | Sierra et al. | |
| 8,104,539 B2 | 1/2012 | Stanojcic et al. | |
| 8,126,689 B2 | 2/2012 | Soliman et al. | |
| 8,196,660 B2 * | 6/2012 | Smith | C09K 8/685 166/250.01 |
| 8,210,257 B2 | 7/2012 | Dusterhoft et al. | |
| 8,267,172 B2 | 9/2012 | Surjaatmadja et al. | |
| 8,307,893 B2 | 11/2012 | Sierra et al. | |
| 8,307,904 B2 | 11/2012 | Surjaatmadja | |
| 8,733,444 B2 | 5/2014 | East, Jr. et al. | |
| 2006/0070740 A1 | 4/2006 | Surjaatmadja et al. | |
| 2006/0086507 A1 | 4/2006 | Surjaatmadja et al. | |
| 2007/0102156 A1 | 5/2007 | Nguyen et al. | |
| 2007/0151735 A1 * | 7/2007 | Ravensbergen et al. | 166/308.1 |
| 2007/0261851 A1 | 11/2007 | Surjaatmadja | |
| 2007/0284106 A1 | 12/2007 | Kalman et al. | |

(56) References Cited

U.S. PATENT DOCUMENTS

| | | | |
|---|---|---|---|
| 2007/0295506 | A1 | 12/2007 | Li et al. |
| 2008/0000637 | A1 | 1/2008 | McDaniel et al. |
| 2008/0060810 | A9 | 3/2008 | Nguyen et al. |
| 2008/0135248 | A1 | 6/2008 | Talley et al. |
| 2009/0062157 | A1 | 3/2009 | Munoz, Jr. et al. |
| 2009/0125280 | A1 | 5/2009 | Soliman et al. |
| 2009/0139728 | A1 | 6/2009 | Schrader et al. |
| 2009/0288833 | A1 | 11/2009 | Graham et al. |
| 2009/0308588 | A1 | 12/2009 | Howell et al. |
| 2010/0000727 | A1 | 1/2010 | Webb et al. |
| 2010/0044041 | A1 | 2/2010 | Smith et al. |
| 2010/0243253 | A1 | 9/2010 | Surjaatmadja et al. |
| 2011/0017458 | A1 | 1/2011 | East, Jr. et al. |
| 2011/0028358 | A1 | 2/2011 | Welton et al. |
| 2011/0067870 | A1 | 3/2011 | East, Jr. |
| 2011/0284214 | A1 | 11/2011 | Ayoub et al. |
| 2012/0118568 | A1 | 5/2012 | Kleefisch et al. |
| 2012/0152550 | A1 | 6/2012 | East, Jr. |
| 2013/0277047 | A1* | 10/2013 | Kuhn de Chizelle E21B 17/203 166/250.12 |

FOREIGN PATENT DOCUMENTS

| | | | |
|---|---|---|---|
| WO | 2008027982 | A2 | 3/2008 |
| WO | 2008139132 | A1 | 11/2008 |
| WO | 2010020747 | A2 | 2/2010 |
| WO | 2010020747 | A3 | 2/2010 |
| WO | 2011010113 | A2 | 1/2011 |
| WO | 2011010113 | A3 | 1/2011 |

OTHER PUBLICATIONS

"Borate Crosslinked Fluids" Halliburton, retrieved Feb. 1, 2017 from http://www.halliburton.com/en-US/ps/stimulation/fracturing/fracturing-fluid-systems/borate-crosslinked-fluids.page.*
Office Action dated Sep. 29, 2014 (39 pages), U.S. Appl. No. 14/106,323, filed Dec. 13, 2013.
Notice of Allowance dated Jul. 31, 2014 (15 pages), U.S. Appl. No. 13/442,411, filed Apr. 9, 2012.
Office Action dated Oct. 9, 2014 (50 pages), U.S. Appl. No. 13/567,953, filed Aug. 6, 2012.
Office Action dated Oct. 16, 2014 (68 pages), U.S. Appl. No. 13/403,423, filed Feb. 23, 2012.
Office Action dated Nov. 20, 2013 (31 pages), U.S. Appl. No. 13/892,710, filed May 13, 2013.
Filing receipt and patent application entitled "Method and Wellbore Servicing Apparatus for Production Completion of an Oil and Gas Well," by Jim B. Surjaatmadja, et al., filed on Aug. 6, 2012 as U.S. Appl. No. 13/567,953.
Foreign communication from a related counterpart application—International Preliminary Report on Patentability, PCT/GB2009/001904, Apr. 19, 2011, 7 pages.
Foreign communication from a related counterpart application—International Search Report and Written Opinion, PCT/GB2010/001407, Mar. 23, 2011, 10 pages.
Foreign communication from a related counterpart application—International Search Report and Written Opinion, PCT/US2013/030784, May 9, 2014, 9 pages.
Office Action dated May 16, 2014 (54 pages), U.S. Appl. No. 13/442,411, filed Apr. 9, 2012.
Office Action dated May 16, 2013 (26 pages), U.S. Appl. No. 12/686,116, filed Jan. 12, 2010.
Office Action dated Jun. 11, 2014 (66 pages), U.S. Appl. No. 12/358,079, filed Jan. 22, 2009.
Filing receipt and specification for patent application entitled "Method for Inducing Fracture Complexity in Hydraulically Fractured Horizontal Well Completions," by Loyd E. East, Jr., et al., filed May 13, 2013 as U.S. Appl. No. 13/892,710.
Filing receipt and specification for patent application entitled "Complex Fracturing Using a Straddle Packer in a Horizontal Wellbore," by Loyd E. East, Jr., filed Dec. 13, 2013 as U.S. Appl. No. 14/106,323.

Advances in Polymer Science, Author Index vols. 101-157 and Subject Index, 2002, 17 pages, Springer-Verlag Berlin Heidelberg.
Advances in Polymer Science, vol. 157, "Degradable Aliphatic Polyesters," 2002, 10 pages of Content and Publishing Information, Springer-Verlag Berlin Heidelberg.
Albertsson, Ann-Christine, et al., "Aliphatic Polyesters: Synthesis, Properties and Applications," Chapter 1 of Advances in Polymer Science, 2002, pp. 1-40, vol. 157, Springer-Verlag Berlin Heidelberg.
Baski brochure entitled, "Packers: general information," http://www.baski.com/packer.htm, Dec. 16, 2009, 4 pages, Baski, Inc.
Cipolla, C. L., et al., "The relationship between fracture complexity, reservoir properties, and fracture treatment design," SPE 115769, 2008, pp. 1-25, Society of Petroleum Engineers.
Edlund, U., et al., "Degradable Polymer Microspheres for Controlled Drug Delivery," Chapter 3 of Advances in Polymer Science, 2002, pp. 67-112, vol. 157, Springer-Verlag Berlin Heidelberg.
Foreign communication from a related counterpart application—Canadian Office Action, CA 2,734,351, Jun. 19, 2012, 2 pages.
Foreign communication from a related counterpart application—International Search Report and Written Opinion, PCT/GB2009/001904, Apr. 13, 2011, 10 pages.
Foreign communication from a related counterpart application—International Preliminary Report on Patentability, PCT/GB2010/001407, Jan. 24, 2012, 8 pages.
Hakkarainen, Minna, "Aliphatic Polyesters: Abiotic and Biotic Degradation and Degradation Products," Chapter 4 of Advances in Polymer Science, 2002, pp. 113-138, vol. 157, Springer-Verlag Berlin Heidelberg.
Halliburton brochure entitled "Cobra Frac® service," Oct. 2004, 2 pages, Halliburton.
Halliburton brochure entitled "Cobra Frac® H service," Mar. 2009, 2 pages, Halliburton.
Halliburton brochure entitled "Cobra Frac® H service," Sep. 2009, 2 pages, Halliburton.
Halliburton brochure entitled "CobraMax® DM Service," Jul. 2011, 2 pages, Halliburton.
Halliburton brochure entitled "Delta Stim™ sleeve," Mar. 2007, 2 pages, Halliburton.
Halliburton brochure entitled "EquiFlow™ inflow control devices," Jan. 2008, 2 pages, Halliburton.
Halliburton brochure entitled, "RDT™—oval pad and straddle packer," Feb. 2008, 2 pages. Halliburton.
Halliburton brochure entitled, "Swellpacker™ cable system," 2009, 2 pages, Halliburton.
Halliburton HT-400 pump maintenance and repair manual, Jun. 1997, pp. 1-14, 1-15, 5-12 to 5-15, and 7-106 to 7-109, Halliburton.
Kundert, Donald, et al., "Proper evaluation of shale gas reservoirs leads to a more effective hydraulic-fracture stimulation," SPE 123586, 2009, pp. 1-11, Society of Petroleum Engineers.
Lindsay, S. et al., "Downhole Mixing Fracturing Method Using Coiled Tubing Efficiently: Executed in the Eagle Ford Shale," SPE 153312, 2012, pp. 1-14, Society of Petroleum Engineers.
Lindblad, Margaretha Söderqvist, et al., "Polymers from Renewable Resources" Chapter 5 of Advances in Polymer Science, 2002, pp. 139-161, vol. 157, Springer-Verlag Berlin Heidelberg.
Mullen, Mike, et al., A composite determination of mechanical rock properties for stimulation design (what to do when you don't have a sonic log), SPE 108139, 2007, pp. 1-13, Society of Petroleum Engineers.
Norris, M. R., et al., "Multiple proppant fracturing of horizontal wellbores in a chalk formation: evolving the process in the Valhall Field," SPE 50608, 1998, pp. 335-349, Society of Petroleum Engineers, Inc.
Office Action dated Oct. 8, 2010 (17 pages), U.S. Appl. No. 12/358,079, filed Jan. 22, 2009.
Office Action dated Apr. 28, 2010 (22 pages), U.S. Appl. No. 12/358,079, filed Jan. 22, 2009.
Office Action dated Apr. 4, 2011 (12 pages), U.S. Appl. No. 12/358,079, filed Jan. 22, 2009.
Office Action (Final) dated Oct. 19, 2011 (12 pages), U.S. Appl. No. 12/358,079, filed Jan. 22, 2009.

(56) References Cited

OTHER PUBLICATIONS

Advisory Action dated Dec. 7, 2011 (2 pages), U.S. Appl. No. 12/358,079, filed Jan. 22, 2009.
Office Action dated Sep. 28, 2011 (27 pages), U.S. Appl. No. 12/566,467, filed Sep. 24, 2009.
Office Action (Final) dated Jan. 26, 2012 (22 pages), U.S. Appl. No. 12/566,467, filed Sep. 24, 2009.
Advisory Action dated Mar. 30, 2012 (3 pages), U.S. Appl. No. 12/566,467, filed Sep. 24, 2009.
Office Action dated Dec. 6, 2012 (24 pages), U.S. Appl. No. 12/566,467, filed Sep. 24, 2009.
Office Action dated May 23, 2012 (43 pages), U.S. Appl. No. 12/686,116, filed Jan. 12, 2010.
Office Action (Final) dated Oct. 29, 2012 (17 pages), U.S. Appl. No. 12/686,116, filed Jan. 12, 2010.
Advisory Action dated Jan. 2, 2013 (4 pages), U.S. Appl. No. 12/686,116, filed Jan. 12, 2010.
Filing receipt and patent application entitled "Multi-Interval Wellbore Treatment Method," by Loyd Eddie East, et al., filed Apr. 9, 2012 as U.S. Appl. No. 13/442,411.
Filing receipt and provisional patent application entitled "High rate stimulation method for deep, large bore completions," by Malcolm Joseph Smith, et al., filed Aug. 22, 2008 as U.S. Appl. No. 61/091,229.
Filing receipt and provisional patent application entitled "Method for inducing fracture complexity in hydraulically fractured horizontal well completions, " by Loyd E. East, Jr., et al., filed Jul. 24, 2009 as U.S. Appl. No. 61/228,494.
Filing receipt and provisional patent application entitled "Method for inducing fracture complexity in hydraulically fractured horizontal well completions, " by Loyd E. East, Jr., et al., filed Sep. 17, 2009 as U.S. Appl. No. 61/243,453.
Ramurthy, Muthukumarappan, et al., "Effects of high-pressure-dependent leakoff and high-process-zone stress in coal stimulation treatments," SPE 107971, 2007, pp. 1-8, Society of Petroleum Engineers.
Rickman, Rick, et al., "A practical use of shale petrophysics for stimulation design optimization: all shale plays are not clones of the Barnett Shale," SPE 115258, 2008, pp. 1-11, Society of Petroleum Engineers.
Sneddon, I. N., "The distribution of stress in the neighbourhood of a crack in an elastic solid," Proceedings of the Royal Society of London; Series A, Mathematical and Physical Sciences, Oct. 22, 1946, pp. 229-260, vol. 187, No. 1009, The Royal Society.
Sneddon, I. N., et al., "The opening of a Griffith crack under internal pressure," 1946, p. 262-267, vol. 4, No. 3, Quarterly of Applied Mathematics.
Soliman, M. Y., et al., "Effect of friction and leak-off on fracture parameters calculated from hydraulic impedance testing," SPE 39529, 1998, pp. 245-251, Society of Petroleum Engineers, Inc.
Soliman, M. Y., et al., "GeoMechanics aspects of multiple fracturing of horizontal and vertical wells," SPE 86992, 2004, pp. 1-15, Society of Petroleum Engineers Inc.
Soliman, M. Y., et al., "Geomechanics aspects of multiple fracturing of horizontal and vertical wells," SPE 86992, SPE Drilling and Completion, Sep. 2008, pp. 217-228, Society of Petroleum Engineers.
Stridsberg, Kajsa M., et al., "Controlled Ring-Opening Polymerization: Polymers with designed Macromolecular Architecture," Chapter 2 of Advances in Polymer Science, 2002, pp. 41-65, vol. 157, Springer-Verlag Berling Heidelberg.
Warpinski, N.R., et al., "Mapping hydraulic fracture growth and geometry using microseismic events detected by a wireline retrievable accelerometer array," SPE 40014, 1998, pp. 335-346, Society of Petroleum Engineers.
Waters, George, et al., "Simultaneous hydraulic fracturing of adjacent horizontal wells in the Woodford Shale," SPE 119635, 2009, pp. 1-22, Society of Petroleum Engineers.

\* cited by examiner

WELLBORE SERVICING FLUIDS AND METHODS OF MAKING AND USING SAME

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

This disclosure relates to methods of servicing a wellbore. More specifically, it relates to compositions and methods for proppant delivery and treatment.

Natural resources (e.g., oil or gas) residing in a subterranean formation may be recovered by driving resources from the formation into the wellbore using, for example, a pressure gradient that exists between the formation and the wellbore, the force of gravity, displacement of the resources from the formation using a pump or the force of another fluid injected into the well or an adjacent well. The production of the fluid in the formation may be increased by hydraulically fracturing the formation. That is, a viscous fracturing fluid may be pumped down the wellbore at a rate and a pressure sufficient to form fractures that extend into the formation, providing additional pathways through which the oil or gas can flow to the well.

To maintain the fractures open when the fracturing pressures are removed, a propping agent (i.e., a proppant) may be used. Proppant packs are typically introduced into the wellbore and surrounding formation during fracturing and completion operations in order to provide a structural frame for both downhole support and fluid collection. However, while delivering a proppant into the wellbore, in order to achieve a high downhole proppant concentration, a concentrated proppant solution may need to be placed downhole. Placing concentrated proppant solutions downhole is often a tedious operation as the viscosity of such solutions may limit the treatment rate (e.g., pump rate). As the treatment rate is decreased, the time for completion fracturing operation is extended resulting in an inability to sustain the fracture width of induced fractures. Further, the turbulence necessary to transport proppant farther into the fracture decreases as the treatment rate decreases. Thus there is an ongoing need for improved compositions and methodologies for proppant delivery and treatment.

SUMMARY

Disclosed herein is a method of servicing a wellbore within a subterranean formation comprising providing a first wellbore tubular positioned within a second wellbore tubular creating a tubular flowpath and an annular flowpath, wherein the tubular flowpath and the annular flowpath converge in a mixing zone within the wellbore, placing an annular fluid through the annular flowpath; placing a tubular fluid through the tubular flowpath, and contacting the annular fluid and the tubular fluid in the mixing zone to form a composite fluid, wherein the composite fluid comprises a base fluid component, a proppant component, a crosslinkable polymer component, a crosslinking agent component, and an optional buffering agent component and wherein the components of the composite fluid are apportioned between the annular fluid and the tubular fluid such that reaction of the components to form the composite fluid is inhibited until the components of the composite fluid mix within the mixing zone.

Also disclosed herein is a system for servicing a wellbore within a subterranean formation comprising: a tubing string positioned within a casing string to provide an annular flowpath and a tubular flowpath, a first fluid in the tubular flowpath comprises a proppant-laden slurry and a buffering agent, a second fluid in the annular flowpath comprises an aqueous solution of a crosslinkable polymer and a crosslinking agent, and a mixing zone disposed within the wellbore proximate to a fracturing interval of the subterranean formation, wherein the first fluid and second fluid are contacted in the mixing zone to form a composite fluid.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques below, including the exemplary designs and implementations illustrated and described herein, but may be modified within the scope of the appended claims along with their full scope of equivalents.

In the drawings and description that follow, like parts are typically marked throughout the specification and drawings with the same reference numerals, respectively. In addition, similar reference numerals may refer to similar components in different embodiments disclosed herein. The drawing figures are not necessarily to scale. Certain features of the invention may be shown exaggerated in scale or in somewhat schematic form and some details of conventional elements may not be shown in the interest of clarity and conciseness. The present invention is susceptible to embodiments of different forms. Specific embodiments are described in detail and are shown in the drawings, with the understanding that the present disclosure is not intended to limit the invention to the embodiments illustrated and described herein. It is to be fully recognized that the different teachings of the embodiments discussed herein may be employed separately or in any suitable combination to produce desired results.

Unless otherwise specified, use of the terms "connect," "engage," "couple," "attach," or any other like term describing an interaction between elements is not meant to limit the interaction to direct interaction between the elements and may also include indirect interaction between the elements described.

Unless otherwise specified, use of the terms "up," "upper," "upward," "up-hole," "upstream," or other like terms shall be construed as generally from the formation toward the surface or toward the surface of a body of water; likewise, use of "down," "lower," "downward," "downhole," "downstream," or other like terms shall be construed as generally into the formation away from the surface or away from the surface of a body of water, regardless of the wellbore orientation. Use of any one or more of the foregoing terms shall not be construed as denoting positions along a perfectly vertical axis.

Unless otherwise specified, use of the term "subterranean formation" shall be construed as encompassing both areas below exposed earth and areas below earth covered by water such as ocean or fresh water.

Disclosed herein are embodiments of wellbore servicing methods, as well as apparatuses and systems that may be utilized in performing same. Particularly, disclosed herein are one or more embodiments of a proppant mixing and treatment (PMT) method. A PMT method of the type disclosed herein utilizes more than one fluid flowpath for preparing a proppant mixture which may then be utilized in subsequent wellbore operations.

Figure 1A:
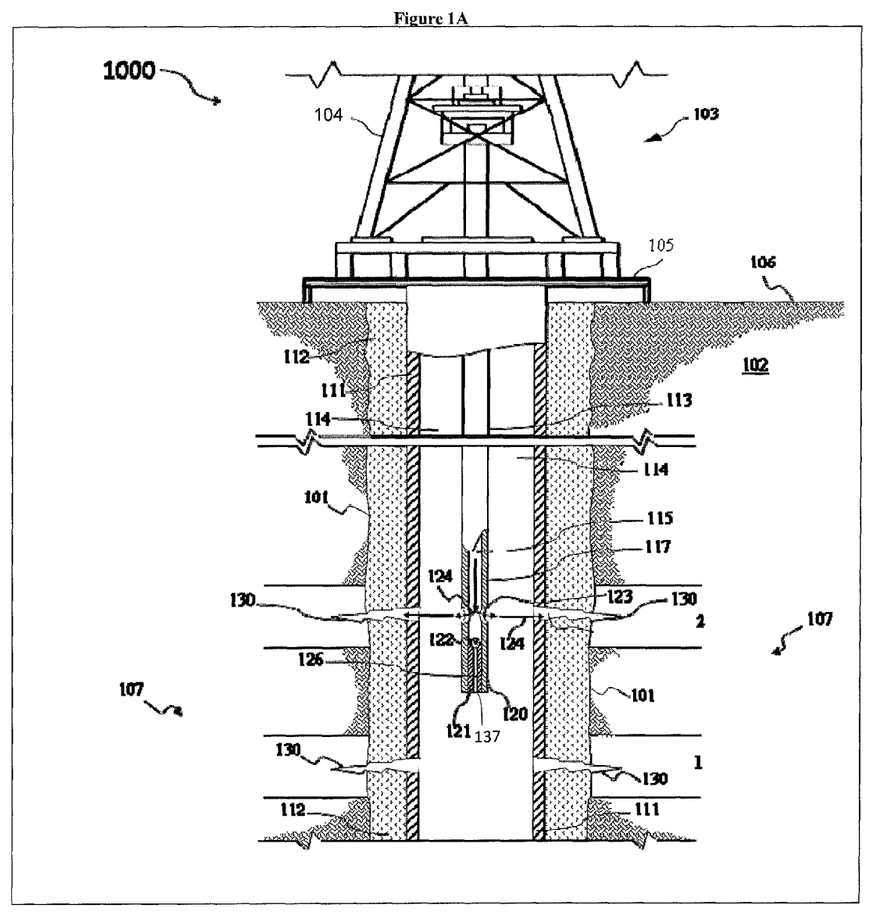
FIG. 1A is partial cut-away view of an embodiment of an environment associated with a wellbore servicing operation and illustrating a first subterranean formation stimulation operation.
Figure 1B:
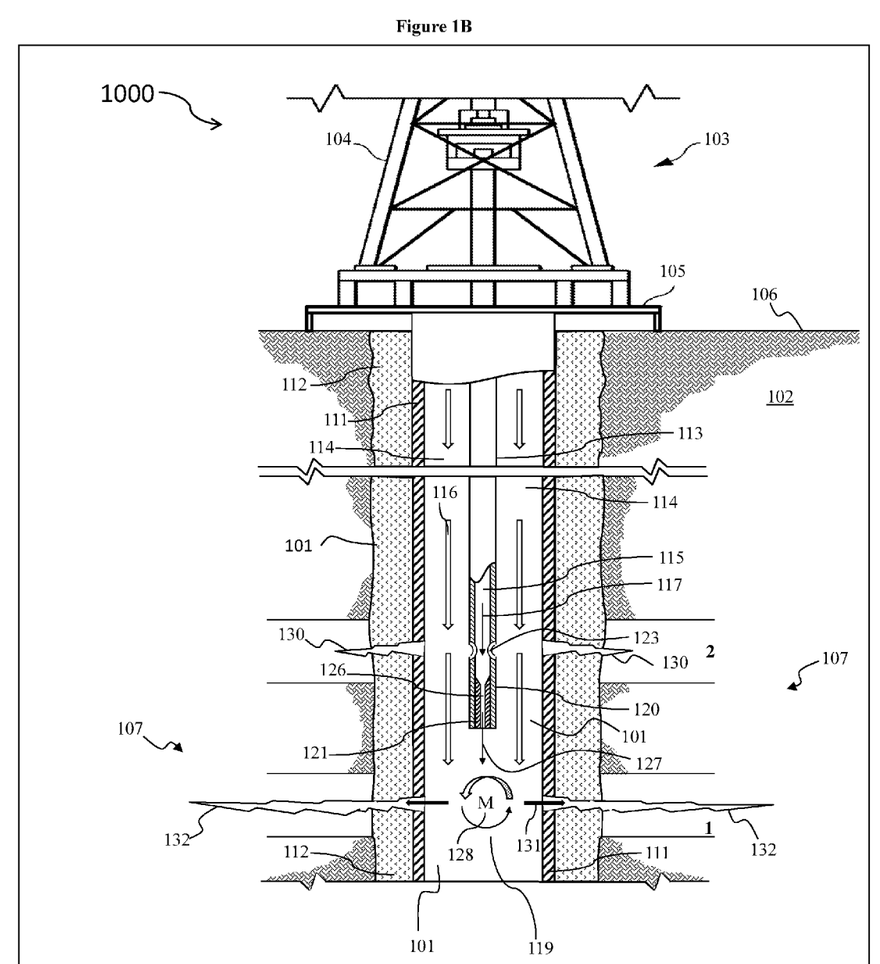
FIG. 1B is partial cut-away view of another embodiment of an environment associated with a wellbore servicing operation and illustrating a second subterranean formation stimulation operation.

Referring to FIGS. 1A and 1B, an embodiment of an operating environment in which such a wellbore servicing apparatus and/or system 1000 and associated methods may be employed is illustrated. It is noted that although some of the figures may exemplify horizontal or vertical wellbores, the principles of the methods, apparatuses, and systems disclosed herein may be similarly applicable to horizontal wellbore configurations, conventional vertical wellbore configurations, and combinations thereof. Therefore, the horizontal or vertical nature of any figure is not to be construed as limiting the wellbore to any particular configuration.

Referring to the embodiment of FIGS. 1A and 1B, the operating environment generally comprises a wellbore 101 that penetrates a subterranean formation 102 for the purpose of recovering hydrocarbons, storing hydrocarbons, disposing of carbon dioxide, or the like. The wellbore 101 may be drilled into the subterranean formation 102 using any suitable drilling technique. In an embodiment, a drilling or servicing rig 103 comprises a derrick 104 with a rig floor 105 through which a work string (e.g., a drill string, a tool string, a segmented tubing string, a jointed tubing string, a coiled tubing string, or any other suitable conveyance, or combinations thereof) generally defining an axial flowbore may be positioned within or partially within the wellbore 101. In an embodiment, such a work string may comprise two or more concentrically positioned strings of pipe or tubing (e.g., a first work string may be positioned within a second work string). The drilling or servicing rig 103 may be conventional and may comprise a motor driven winch and other associated equipment for lowering the work string into the wellbore 101. Alternatively, a mobile workover rig, a wellbore servicing unit (e.g., coiled tubing units), or the like may be used to lower the work string into the wellbore 101. In such an embodiment, the work string may be utilized in drilling, stimulating, completing, or otherwise servicing the wellbore.

The wellbore 101 may extend substantially vertically away from the earth's surface 106 over a vertical wellbore portion, or may deviate at any angle from the earth's surface 106 over a deviated or horizontal wellbore portion. In alternative operating environments, portions or substantially all of the wellbore 101 may be vertical, deviated, horizontal, and/or curved and such wellbore may be cased, uncased, or combinations thereof.

Referring again to FIGS. 1A and 1B, in an embodiment, the wellbore 101 may be at least partially cased with a casing string 111 generally defining an axial flowbore, alternatively the wellbore 101 may be at least partially cased with a liner. In an alternative embodiment, at least a portion of a wellbore, like wellbore 101, may remain uncased. The casing string 111 may be secured into position within the wellbore 101 in a conventional manner with cement 112, alternatively, the casing string 111 may be partially cemented within the wellbore, or alternatively, the casing string may be uncemented. For example, in an alternative embodiment, a portion of the wellbore 101 may remain uncemented, but may employ one or more packers (e.g., mechanical packers or swellable packers) to secure the casing string 111 within the wellbore 101 and/or to isolate two or more adjacent portions, zones, or stages within the wellbore 101. In an embodiment, where the casing string comprises a liner, the liner may be positioned within a portion of the wellbore 101, for example, lowered into the wellbore 101 suspended from the work string. In such an embodiment, the liner may be suspended from the work string by a liner hanger or the like. Such a liner hanger may comprise any suitable type or configuration of liner hanger, as will be appreciated by one of skill in the art with the aid of this disclosure.

In an embodiment, as may be appreciated by one of skill in the art upon viewing this disclosure, a casing string or liner, such as casing string 111, may generally comprise a pipe or tubular, which may comprise a plurality of joints or sections, and which may be placed within the wellbore for the purpose of maintaining formation integrity, preventing collapse of the wellbore, controlling formation fluids, preventing unwanted losses of fluid to the formation, or the like. As such, the casing string 111 may be configured to prevent unintended fluid communication between the axial flowbore and the formation 102.

While the exemplary operating environment depicted in FIGS. 1A and 1B refers to a stationary drilling rig 103 for accessing a land-based wellbore 101, one of ordinary skill in the art will readily appreciate that mobile workover rigs, wellbore servicing units (e.g., coiled tubing units), and the like may be used for accessing the wellbore 101. It should be understood that the PMT method may alternatively be used in other operational environments, such as within an offshore wellbore operational environment.

Figure 2:
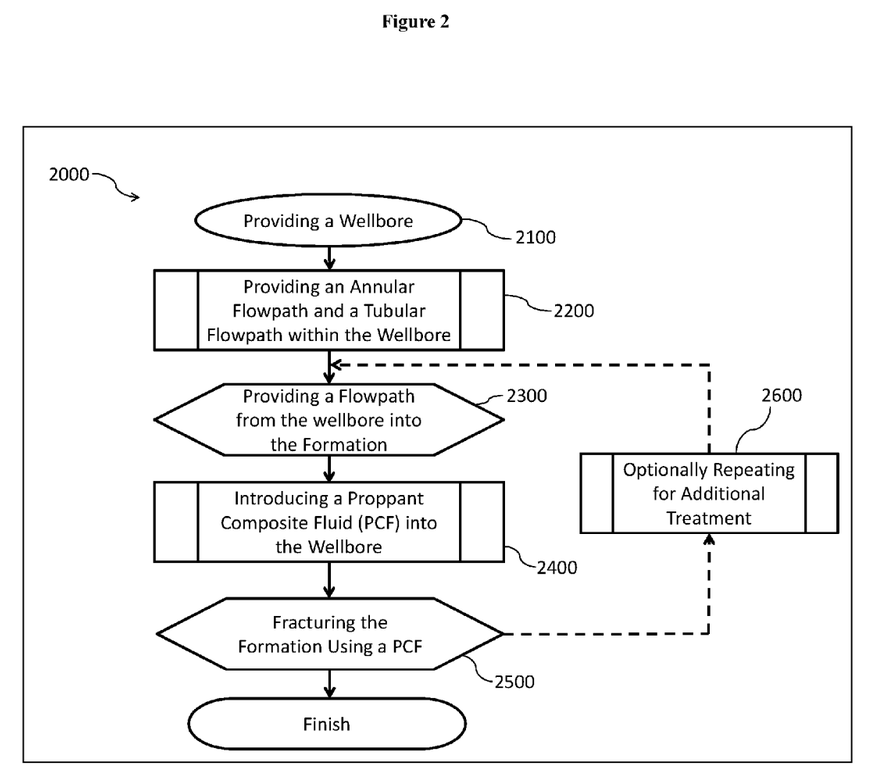
FIG. 2 is a schematic representation of a proppant mixing and treatment method.

Referring to FIG. 2, an embodiment of the PMT method 2000 is schematized. In the embodiment of FIG. 2, the PMT method 2000 generally comprises the steps of providing a wellbore 2100; providing an annular flowpath and a tubular flowpath within the wellbore 2200; providing a flowpath from the wellbore into the formation 2300; introducing a proppant composite fluid (composite fluid) into the wellbore 2400; fracturing the formation using the composite fluid 2500; and optionally repeating the method for additional treatment 2600.

In various embodiments, and as will be disclosed herein, the PMT method 2000 may be applicable to newly completed wellbores, previously completed wellbores that have not been previously stimulated or subjected to production, previously completed wellbores that have not been previously stimulated but have been previously subjected to production, wellbores that have been previously stimulated and have been previously subjected to production, or combinations thereof.

Referring to the embodiment of FIGS. 1A and 1B, the wellbore 101 may have been drilled into the subterranean formation 102 as previously described herein.

In an embodiment, the wellbore may comprise two or more wellbore tubulars (e.g., casing strings, work strings, etc.) at least a portion of a first wellbore tubular being concentrically positioned within at least a portion of a second wellbore tubular. Referring to the embodiment of FIGS. 1A and 1B, the wellbore 101 comprises a tubular work string 113 positioned within the casing string 111. In an embodiment, the tubular work string 113 comprises a coiled tubing, a stick pipe, an open ended production tubing, a casing string, a liner, a production string, a completion string, a drill string, a tool string, a tubing string, a segmented tubing string, a jointed tubing string, or another suitable type of string, or combinations thereof.

In an embodiment, the tubular work string 113 comprises at least a portion of a servicing tool that may be located at the end of the tubular work string 113 that is positioned in the proximity of the producing zone 107. In such embodiment, the end of the tubular work string 113 may be configured to deliver fluids with different properties, i.e., different viscosities, different flow rates, etc.

The wellbore 101 configuration comprising a tubular work string 113 positioned within the casing string 111 leads to two distinct flowpaths (i.e., annular flowpath 114 and tubular flowpaths 115) that are isolated from each other until they reach a portion of the wellbore proximate the producing zone 107. In an embodiment, the annular flowpath 114 comprises the annular space between the tubular work string 113 and the casing string 111 (e.g., as shown by annular flowpath arrow 116). In an embodiment, the tubular flowpath 115 comprises the flow space within the tubular work string 113 (e.g., as shown by tubular flowpath arrow 117).

Referring to the embodiment of FIGS. 1A and 1B, a fluid may be introduced into the annular flowpath 114 using any suitable methodology (e.g., pumping). A fluid present in the annular flowpath 114 may be referred to as an annular fluid. In an embodiment, the annular fluid flowpath may follow annular flowpath arrow 116.

In an embodiment, the annular fluid may be characterized by a viscosity of from about 1 cP to about 100 cP, alternatively from about 10 cP to about 90 cP, alternatively from about 20 cP to about 80 cP, or alternatively from about 20 cP to about 60 cP.

Referring to the embodiment of FIGS. 1A and 1B, a fluid may be introduced into the tubular flowpath 115 using any suitable methodology (e.g., pumping). A fluid present in the tubular flowpath 115 may be referred to as a tubular fluid. In an embodiment, the tubular fluid flowpath may follow tubular flowpath arrow 117.

In an embodiment, the tubular fluid may be characterized by a viscosity of from about 1 cP to about 100 cP, alternatively from about 10 cP to about 80 cP, alternatively from about 15 cP to about 50 cP or alternatively from about 20 cP to about 60 cP.

In an embodiment, the PMT method 2000 comprises providing a flowpath into the formation 2300. In such embodiments, a flowpath into the formation may be established by providing one or more perforations and/or perforation clusters (e.g., a plurality of associated or closely-positioned perforations) in the casing string 111. In an embodiment, the casing, cement sheath, and/or surrounding formation are perforated to provide a flowpath and associated route of fluid communication from the wellbore into the surrounding formation. Perforations generally refer to openings extending through the walls of a casing and/or liner, through the cement sheath surrounding the casing or liner (when present), and, in some embodiments, into the formation.

Perforations may be formed using any suitable methodology or apparatus. For example, in an embodiment, the perforations may be formed by a fluid jetting apparatus (e.g., a hydrajetting tool). A suitable fluid jetting apparatus and the operation thereof is described in more detail in U.S. Publication Nos. 2011/0088915, 2010/0044041, and U.S. Pat. No. 7,874,365, each of which is incorporated by reference herein in its entirety. Additionally or alternatively, perforations may be provided via explosive charges such as shaped charges.

Referring to FIGS. 1A and 1B, the end of the tubular work string 113 comprises an embodiment of a fluid jetting apparatus 120 and is illustrated in operation within the wellbore 101. In the embodiment of FIGS. 1A and 1B, the fluid jetting apparatus 120 is selectively configurable to deliver a relatively low-volume, relatively high-pressure fluid stream (e.g., as would be suitable for a perforating operation, as seen in FIG. 1A) or to deliver a relatively high-volume, relatively low-pressure fluid stream (e.g., as would be suitable for a fracturing operation, as seen in FIG. 1B).

In the embodiment of FIG. 1A, the fluid jetting apparatus 120 is configured for a perforating operation, for example, by introducing an obturating member 122 (e.g., via a ball, foam dart, mechanical dart, etc.) into the tubular work string 113 and forward-circulating the obturating member 122 to engage a seat or baffle 121 within the fluid jetting apparatus 120 and thereby configure the fluid jetting apparatus 120 for the perforating operation (e.g., by providing a route of fluid communication via one or more fluid jetting orifices 123 and by obscuring a route of fluid communication via one or more relatively high-volume fracturing ports 137). Upon engaging the seat 121, such an obturating member 122 may substantially restrict or impede the passage of fluid from one side of the obturating member to the other. The fluid jetting apparatus 120 may be positioned proximate and/or substantially adjacent to the formation zone into which a perforation is to be introduced (e.g., fracturing interval 2, as illustrated in the embodiment of FIG. 1A) and a suitable perforating fluid may be pumped via the tubular flowpath 115 of the tubular work string 113 to the fluid jetting apparatus 120. In various embodiments, the tubular fluid comprising a perforating fluid may comprise a particulate and/or abrasive material (e.g., proppant, sand, steel fines, glass particles, and the like). The perforating fluid may be pumped at rate and/or pressure such that the fluid is emitted from the fluid jetting apparatus 120 via the fluid jetting orifices 123 (e.g., jets, nozzles, erodible nozzles, or the like), as shown by tubular flowpath arrows 124, at a rate and/or pressure sufficient to erode, abrade, and/or degrade walls of the adjacent and/or proximate casing string 111, and/or the cement sheath 112 surrounding the casing string 111, and thereby forming one or more perforations 130. The perforating fluid may be returned to the surface via the annular flowpath 114.

In an alternative embodiment, the perforations 130 may be formed by the operation of a perforating gun. Such a perforating gun may be configured to selectively detonate one or more explosive charges thereby penetrating the walls of the casing string 113 or liner and/or cement 112 and so as to create the perforation 130. A suitable perforating gun may be conveyed into position within the wellbore via a workstring (e.g., a coiled tubing string), a wireline, a tractor, or by any other suitable means of conveyance. In such an embodiment, the perforating gun may be lowered into the wellbore, for example, suspended from a work string like the tubular work string 113 or a wireline, and actuated (e.g., fired) to form perforations. In still another embodiment, a casing string 111 or liner may be perforated prior to placement within a wellbore 101.

In an alternative embodiment, a perforation comprises a casing window and/or casing door assembly, for example having actuatable windows (e.g., sliding sleeves) that are selectively configurable to provide a route of fluid communication from the interior of the wellbore to the surrounding formation. In such embodiments, the casing string 111 typically is not cemented within the wellbore 101, and the casing string 111 may also comprise a plurality of packers (e.g., mechanical packers or swellable packers, such as SwellPackers™, commercially available from Halliburton Energy Services), typically positioned on the exterior of the casing in the annulus between the casing and the wellbore wall and utilized to secure the casing string 111 within the wellbore 101 and to isolate adjacent fracturing intervals (e.g., fracturing interval 1 from fracturing interval 2, etc.) of the wellbore 101 and/or adjacent formation zones. The casing window assembly may generally refer to an assemblage, which may be incorporated within a casing string or liner, and which may be configurable to provide a route of fluid communication between the axial flowbore of the casing and an exterior of the casing. In an embodiment, the casing windows may be activatable and/or deactivatable, for example, such that the casing windows are selectively configurable to allow and/or disallow fluid communication. For example, a casing window assembly may generally comprise a housing having one or more ports providing a route of fluid communication between the axial flowbore of the casing and an exterior of the casing dependent upon the positioning of a sliding sleeve. The sliding sleeve may be movable, relative to the housing, from a first position (e.g., a closed position), in which the sliding sleeve obstructs the ports, to a second position (e.g., as open position), in which the sliding sleeve does not obstruct the ports. Additionally, in an embodiment, the ports may be fitted with a suitable fluid-pressure altering device (e.g., jets, nozzles, erodible nozzles, or the like), for example, such that fluid communication via the fluid-pressure altering device may erode and/or degrade a portion of the formation and/or, when present, a cement sheath surrounding the casing window assembly (e.g., in embodiments where a cement sheath is present).

In various embodiments, the casing windows may be activatable and/or deactivatable by any suitable method or apparatus. For example, in various embodiments, a casing window assembly may be activatable or deactivatable, (e.g., by transitioning the sliding sleeve from the first to the second position or from the second to the first position) via one or more of a mechanical shifting tool, an obturating member (e.g., a ball or dart), a wireline tool, a pressure differential, a rupture disc, a biasing member (e.g., a spring), or combinations thereof. In alternative embodiments, a casing window assembly may be activated and/or deactivated by any suitable method or apparatus. Suitable methods and apparatuses may be appreciated by one of skill in the art upon viewing this disclosure.

The wellbore servicing methods, wellbore servicing apparatuses, and wellbore servicing systems disclosed herein include embodiments for stimulating the production of hydrocarbons from subterranean formations, wherein two or more components of a composite wellbore servicing fluid, also termed a composite fluid, are introduced into a wellbore from two or more flowpaths such that the composite fluid may be mixed proximate to the production zone into which the composite fluid will be placed.

Referring to the embodiment of FIG. 1B, the PMT method 2000 comprises: introducing a first component of a composite fluid via the annular flowpath 114 (i.e., an annular fluid); introducing a second component of a composite fluid via the tubular flowpath 115 (i.e., a tubular fluid); establishing a zone of fluid communication 119 (e.g., a mixing or turbulent zone) within the annular flowpath 115; and mixing the annular fluid with the tubular fluid within the zone of fluid communication 119 (FIG. 1B) to form a mixed, composite fluid.

In an embodiment, the annular and tubular fluid are not contacted outside of the region of the wellbore proximate producing zone 107 (e.g, within the zone of fluid communication 119). In an embodiment, the annular and tubular fluid are contacted in a volumetric ratio of annular fluid: tubular fluid of about 8:1 alternatively about 5:1, or alternatively from about 1:1.

Referring to the embodiment of FIG. 1B, when there is no obturating member engaged in the seat 121, the tubular fluid is forced to exit the tubular flowbore 115 via the tubular seat flowbore 126, as shown by tubular flowpath arrow 127. In such embodiment, the tubular fluid will meet the annular fluid in the zone of fluid communication 119, and the two fluids will mix as shown by mixing arrows 128 in FIG. 1B. While in the embodiment of FIG. 1B the tubular fluid is designed to exit the tubular working string 113 via the tubular seat flowbore 126, as shown by the tubular flowpath arrow 127, some tubular fluid might exit the tubular working string 113 via the tubular fluid jetting orifices 123 and mix with the annular fluid adjacent and/or downstream from the orifices 123.

In an embodiment, the annular fluid and the tubular fluid will contact each other in a zone of fluid communication 119 and form a composite fluid reaction product or mixture (e.g., a composite fluid). In an embodiment, the individual components of the composite fluid may undergo a transformation (e.g., chemical reaction) that leads to the formation of a composite fluid.

In an embodiment, the composite fluid is a perforating fluid, a fracturing fluid, an acidizing fluid, a pre-flush fluid, a flush fluid, an isolation fluid, a pad fluid, or any combination thereof. In an embodiment the composite fluid is formed from the contacting of an annular fluid and a tubular fluid, wherein each of the annular fluid and the tubular fluid comprise one or more components of the composite fluid. As is described herein, in various embodiments, the components of the composite fluid may be apportioned between the annular fluid and the tubular fluid to isolate one or more reactive components such that formation of the composite fluid is delayed and/or controlled until desired contact and mixing of the reactive components is completed in situ within the wellbore proximate a zone of interest (e.g., a zone undergoing fracturing). In an embodiment, the components of the annular fluid and tubular fluid (and, thus the resultant composite fluid mixture and/or reaction product) are each selected from the group consisting of a base fluid, a proppant, a crosslinkable polymer, a crosslinking agent, a buffering agent, additives, or combinations thereof.

In an embodiment, the composite fluid comprises a base fluid. In an embodiment, the base fluid may comprise a substantially aqueous fluid. As used herein, the term "substantially aqueous fluid" may refer to a fluid comprising less than about 25% by weight of a non-aqueous component, alternatively, less than 20% by weight, alternatively, less than 15% by weight, alternatively, less than 10% by weight, alternatively, less than 5% by weight, alternatively, less than 2.5% by weight, alternatively, less than 1.0% by weight of a non-aqueous component. Examples of suitable substantially aqueous fluids include, but are not limited to, water that is potable or non-potable, untreated water, partially treated water, treated water, produced water, city water, well-water, surface water, or combinations thereof. In an alternative or additional embodiment, the base fluid may comprise an aqueous fluid, an aqueous gel, a viscoelastic surfactant gel, an oil gel, a foamed gel, an emulsion, an inverse emulsion, or combinations thereof. In an embodiment, the base fluid comprises a fracturing fluid. In an embodiment, the annular fluid and the tubular fluid are aqueous based fluids, for example a water based pumpable fluid or slurry (e.g., an aqueous slurry of proppant and/or other solid materials).

In an embodiment, the base fluid may be characterized by a viscosity of from about 1 cP to about 100 cP, alternatively from about 10 cP to about 90 cP, or alternatively from about 20 cP to about 30 cP.

In an embodiment, a base fluid may be present in the composite fluid in an amount of from about 25% to about 100%, alternatively from about 50% to about 100%, or alternatively from about 75% to about 100%, based on the total weight of the composite fluid.

In an embodiment, the composite fluid comprises a proppant. In an embodiment, the proppant may comprise any suitable particulate material, which may be used to prop fractures open, i.e., a propping agent or a proppant. As used herein, a proppant refers to a particulate material that is suitable for use in a proppant pack or a gravel pack. When deposited in a fracture, the proppant may form a proppant pack, resulting in conductive channels through which fluids may flow to the wellbore. The proppant functions to prevent the fractures from closing due to overburden pressures.

Nonlimiting examples of proppants suitable for use in this disclosure include silica (sand), graded sand, Ottawa sands, Brady sands, Colorado sands; resin-coated sands; gravels; synthetic organic particles, nylon pellets, high density plastics, teflons, rubbers, resins; ceramics, aluminosilicates; glass; sintered bauxite; quartz; aluminum pellets; ground or crushed shells of nuts, walnuts, pecans, almonds, ivory nuts, brazil nuts, and the like; ground or crushed seed shells (including fruit pits) of seeds of fruits, plums, peaches, cherries, apricots, and the like; ground or crushed seed shells of other plants (e.g., maize, corn cobs or corn kernels); crushed fruit pits or processed wood materials, materials derived from woods, oak, hickory, walnut, poplar, mahogany, and the like, including such woods that have been processed by grinding, chipping, or other form of particleization; or combinations thereof. In an embodiment, the proppant comprises sand.

The proppants may be of any suitable size and/or shape. Proppant particle size may be chosen by considering a variety of factors such as the particle size and distribution of the formation sand to be screened out by the proppant. In an embodiment, a proppant suitable for use in the present disclosure may have an average particle size in the range of from about 2 to about 400 mesh, alternatively from about 8 to about 100 mesh, or alternatively about 10 to about 70 mesh, U.S. Sieve Series.

In an embodiment, the proppant comprises one or more components of PROPSTOP and PROPSTOP ABC services, SANDTRAP and SANDTRAP ABC formation consolidation services, SANDWEDGE and SANDWEDGE ABC conductivity enhancement systems, or combinations thereof. PROPSTOP and PROPSTOP ABC services are aqueous-based systems to help control proppant flowback; SANDTRAP and SANDTRAP ABC formation consolidation services are aqueous based systems to help control sand production; and SANDWEDGE and SANDWEDGE ABC conductivity enhancement services are proppant pack conductivity enhancers that rely on resin coating the proppant to provide improved and sustained fracture conductivity; each of which is commercially available from Halliburton Energy Services.

In an embodiment, a proppant may be present in the composite fluid in an amount of to provide a proppant density ranging from about 0 pounds per gallon (ppg) to about 20 ppg, alternatively from about 1 ppg to about 20 ppg, or alternatively from about 5 ppg to about 20 ppg, based on the total weight of the composite fluid.

In an embodiment, the composite fluid comprises a crosslinkable polymer. Herein the disclosure may refer to a polymer and/or a polymeric material. It is to be understood that the terms polymer and/or polymeric material herein are used interchangeably and are meant to each refer to compositions comprising at least one polymerized monomer in the presence or absence of other additives traditionally included in such materials.

In an embodiment, the crosslinkable polymer comprises polysaccharides, such as starches, cellulose, dextran, substituted or unsubstituted galactomannans, guar gums, high-molecular weight polysaccharides composed of mannose and galactose sugars, heteropolysaccharides obtained by the fermentation of starch-derived sugar (e.g., xanthan gum), diutan, scleroglucan, derivatives thereof, or combinations thereof.

In an embodiment, the crosslinkable polymer comprises cellulose or a cellulose derivative. Nonlimiting examples of cellulose derivatives suitable for use in the present disclosure include cellulose ethers, carboxycelluloses, carboxyalkylhydroxyethyl celluloses, hydroxyethylcellulose, hydroxypropylcellulose, carboxymethylhydroxyethylcellulose, carboxymethylcellulose (CMC), or combinations thereof. In an embodiment, the crosslinkable polymer comprises CMC.

In an embodiment, the crosslinkable polymer comprises guar or a guar derivative. Nonlimiting examples of guar derivatives suitable for use in the present disclosure include hydroxypropyl guar, carboxymethylhydroxypropyl guar, carboxymethyl guar, hydrophobically modified guars, guar-containing compounds, or combinations thereof.

In an embodiment, the crosslinkable polymer comprises one or more components of PERMSTIM fracturing service, CLEANSTIM fracturing service, HYBOR fracturing fluid, PUR-GEL III, DELTAFRAC 200, DELTAFRAC 140, SIROCCO, or combinations thereof. PERMSTIM fracturing service is based on a derivatized natural polymer that does not contain insoluble residue; CLEANSTIM fracturing service is a hydraulic fluid fracturing system formulated with ingredients sourced from the food industry; HYBOR fracturing fluid is a delayed borate-crosslinked fluid using guar or hydroxypropyl guar (HPG) gelling agent; and PUR-GEL III is CMHPG polymer based fluid that uses a delayed zicronate crosslinker; DELTAFRAC 200 and DELTAFRAC 140 are borate-crosslinked guar fluid systems; SIROCCO is a zirconate-crosslinked CMHPG fluid system; each of which is commercially available from Halliburton Energy Services.

In an embodiment, a crosslinkable polymer may be present in the composite fluid in an amount of from about 0.005 wt. % to about 1 wt. %, alternatively from about 0.005 wt. % to about 0.5 wt. %, or alternatively from about 0.005 wt. % to about 0.3 wt. %, based on the total weight of the composite fluid.

In an embodiment, the composite fluid comprises a crosslinking agent. In an embodiment, the activity of the crosslinking agent is pH-dependent, i.e., a particular crosslinking agent will effect the crosslinking of a crosslinkable polymer in a particular pH range. The magnitude of the pH range where a crosslinking agent is active may range from about 2 pH units to about 12 pH units, alternatively from about 4 pH units to about 11.5 pH units, or alternatively from about 4.8 pH units to about 11.5 pH units.

Alternatively, in an embodiment, the activity of the crosslinking agent is temperature-dependent, i.e., a particular crosslinking agent will effect the crosslinking of a crosslinkable polymer in a particular temperature range. In an embodiment, the crosslinking agent may be active at temperatures of from about 35° F. to about 425° F., alternatively from about 60° F. to about 400° F., or alternatively from about 70° F. to about 380° F.

In an embodiment, the crosslinking agent comprises boron-based compounds, such as potassium metaborate, monoethanolamine borate, zirconium-containing complexes, such as zirconate, zirconium lactate, triethanolamine zirconate, aluminum-containing complexes, aluminum sulfate, triisopropanolamine, acetate lactate oxo ammonium or combinations thereof.

In an embodiment, the crosslinking agent comprises one or more components of HYBOR fracturing fluid; CLEANLINK crosslinker; BC-140 crosslinker; BC-200 crosslinker; CL-23 crosslinker; CL-24 crosslinker; CL-28M crosslinker; CL-29 crosslinker; CL-31 crosslinker; CL-36 crosslinker; K-38 crosslinker; or combinations thereof. CLEANLINK crosslinker is a crosslinking agent; BC-140 crosslinker is a specially formulated crosslinker/buffer system; BC-200 crosslinker is a delayed crosslinker that functions as both crosslinker and buffer; CL-23 crosslinker is a delayed crosslinking agent that is compatible with $CO_2$; CL-24 crosslinker is a zirconium-ion complex used as a delayed temperature-activated crosslinker; CL-28M crosslinker is a water-based suspension crosslinker of a borate mineral; CL-29 crosslinker is a fast acting zirconium complex; CL-31 crosslinker is a concentrated solution of non-delayed borate crosslinker; CL-36 crosslinker is a new mixed metal crosslinker; K-38 crosslinker is a borate crosslinker; each of which is commercially available from Halliburton Energy Services, Inc.

In an embodiment, a crosslinking agent may be present in the composite fluid in an amount of from about 0.1 gal/Mgal to about 10 gal/Mgal, alternatively from about 0.5 gal/Mgal to about 5 gal/Mgal, or alternatively from about 1 gal/Mgal to about 5 gal/Mgal.

In an embodiment, the composite fluid comprises a buffering agent. Without wishing to be limited by theory, a buffering agent is a substance that, when added to a solution, resists a change in hydrogen ion concentration (i.e., pH) that otherwise would be caused by the presence of an acid or a base in the solution.

Non-limiting examples of buffering agents suitable for use in this disclosure include carbonates, potassium carbonate, sodium carbonate, calcium carbonate, bicarbonates, sodium bicarbonate, potassium bicarbonate, phosphates, monosodium phosphate, disodium phosphate, monopotassium phosphate, dipotassium phosphate, ammonium phosphate, diammonium phosphate, citric acid, citrates, acetic acid, magnesium oxide, acetates, borates, or combinations thereof.

In an embodiment, the buffering agent comprises BA-20 buffering agent, BA-40 buffering agent, BA-2 buffering agent, K-35 buffering agent, MO-67 pH adjuster, or combinations thereof. BA-20 buffering agent is a buffering agent that does not interfere with oxidizing breakers; BA-40 buffering agent is an alkaline, carbonate-based buffering additive; BA-2 buffering agent is a pH-control agent that helps regulate crosslink times; K-35 buffering agent is a finely divided, moderately alkaline white powder that provides buffering action for some base gel fluids and raises their pH; each of which is commercially available from Halliburton Energy Services.

In an embodiment, the buffering agents suitable for use in this disclosure may allow for buffering from a pH of from about 2 to about 11.5, alternatively from about 5 to about 11.5, or alternatively from about 6 to about 11.5.

In an embodiment, a buffering agent may be present in the composite fluid in an amount of from about 0.5 gal/Mgal to about 10 gal/Mgal, alternatively from about 1 gal/Mgal to about 10 gal/Mgal, or alternatively from about 2 gal/Mgal to about 10 gal/Mgal, based on the total weight of the composite fluid.

In an embodiment, the composite fluid may further comprise additional additives as deemed appropriate for improving the properties of the proppant composite fluid. Such additives may vary depending on the intended use of the composite fluid in the wellbore. Examples of such additives include, but are not limited to, emulsifiers, lime, organic/inorganic viscosifiers, weighting agents, glass fibers, carbon fibers, suspending agents, conditioning agents, dispersants, water softeners, oxidation and corrosion inhibitors, thinners, acid gas scavengers and combinations thereof. These additives may be introduced singularly or in combination using any suitable methodology and in amounts effective to produce the desired improvements in composite fluid properties.

As will be understood by one of ordinary skill in the art, the composite fluid formed by the contacting of an annular fluid and a tubular fluid may initially comprise one or more reactive components such that the final composition of the composite fluid may depend on the reactivity of the initial components and/or the wellbore conditions. For example, and as will described in more detail herein, the composite fluid formed by the contacting of an annular and tubular fluid may comprise polymerizable and/or crosslinkable materials that under the conditions of the wellbore and/or the presence of additional materials may polymerize and/or crosslink. Thus in some embodiments the composite fluid formed by the contacting of an annular and tubular fluid may be characterized by some initial composition that can change over a time period due to the reactivity of the components of the composite fluid and/or the conditions of the wellbore. In alternative embodiments, the composition of the composite fluid formed by the contacting of an annular and tubular fluid may be characterized by a composition that remains relatively unchanged over a time period.

In an embodiment, upon contacting the annular fluid with the tubular fluid as previously described herein, the components of the annular and tubular fluids react to form a composite fluid. In such an embodiment, the crosslinking agent may interact with the crosslinkable polymer resulting in the formation of a crosslinked polymer network. In an embodiment, the proppant may be dispersed throughout the crosslinked polymer network, contained within a portion of the crosslinked polymer network, at least partially entangled or entwined with the crosslinked polymer network, or otherwise associated with the crosslinked polymer network such that the proppant and crosslinked polymer network form a composite fluid. For example, the crosslinked polymer network may engulf, embed, envelop, confine, surround, encompass, or otherwise retain the proppant. In an embodiment, the proppant is disposed within the crosslinked polymer network such that the entirety of the dimensions of the proppant lies within the dimensions of the crosslinked polymer network.

In an embodiment, the crosslinking agent will contact the crosslinkable polymer in the presence of the buffering agent, such that the pH of the solution is maintained at a value that renders the crosslinking agent active (i.e., capable of effecting the crosslinking of the crosslinkable polymer).

In an embodiment, the buffering agent, the crosslinking agent, and the crosslinkable polymer may not contact each other prior to the fluids reaching the wellbore 101 portion located proximal to the producing zone 107, e.g., zone of fluid communication/mixing 119. Each of the annular fluid and the tubular fluid may comprise more than one but less than all of the components utilized to form the composite fluid. In an embodiment, the proppant may be present in the annular fluid and/or the tubular fluid. The components utilized to form the composite treatment fluid may be distributed between the annular and tubular fluids in any order/fashion that is compatible with some user and/or process need.

In an embodiment, the annular fluid comprises the crosslinkable polymer and the crosslinking agent, while the tubular fluid comprises the buffering agent. Alternatively, in an embodiment, the tubular fluid comprises the crosslinkable polymer and the crosslinking agent, while the annular fluid comprises the buffering agent.

In an embodiment, the annular fluid comprises the crosslinkable polymer and the buffering agent, while the tubular fluid comprises the crosslinking agent. Alternatively, in an embodiment, the tubular fluid comprises the crosslinkable polymer and the buffering agent, while the annular fluid comprises the crosslinking agent.

In an embodiment, the annular fluid comprises the crosslinking agent and the buffering agent, while the tubular fluid comprises the crosslinkable polymer. Alternatively, in an embodiment, the tubular fluid comprises the crosslinking agent and the buffering agent, while the annular fluid comprises the crosslinkable polymer.

In an embodiment, the composite fluid may be characterized by a viscosity of from about 250 cP to about 6,000 cP, alternatively from about 300 cP to about 5,500 cP, or alternatively from about 1,000 cP to about 5,000 cP.

In an embodiment, the crosslinkable polymer comprises one or more components of PERMSTIM fracturing service, and the crosslinking agent comprises a zirconium-based. In such embodiment, the tubular fluid comprises a sand-laden fluid that is buffered with BA-20 buffering agent at a pH of 4.8, while the annular fluid comprises the PERMSTIM fracturing service component, and the zirconium-based crosslinker, which are at a neutral pH. Once the annular fluid and the tubular fluid reach the wellbore 101 portion located proximal to the production zone 107, they contact each other and mix. When the zirconium-based crosslinker enters the solution buffered at a pH of 4.8, it may activate and crosslink the PERMSTIM fracturing service component, suspending the sand, and creating the composite fluid.

In an embodiment, the crosslinkable polymer comprises one or more components of HYBOR fracturing fluid, and the crosslinking agent comprises CL-28M crosslinker (i.e., a borate-based crosslinker). In such an embodiment, the tubular fluid comprises a sand-laden fluid that is buffered with BA-40L buffering agent at a basic pH of greater than about 10, while the annular fluid comprises the guar and/or hydroxypropylguar, and the CL-28M crosslinker which are at a neutral pH. In an embodiment, the bottom hole temperature (BHT) is of from about 180° F. to about 320° F. The borate-based crosslinker may be activated by both the BHT and pH. The annular fluid and the tubular fluid may contact each other once reaching the wellbore 101 portion located proximal to the production zone 107. Upon contact and mixing of the annular and tubular fluids the borate-based crosslinker may activate and crosslink the crosslinkable polymer (i.e., guar/HPG), entrapping the sand resulting in a composite fluid.

In an embodiment, the crosslinkable polymer comprises guar, and the crosslinking agent comprises CL-31, a borate-based crosslinker that is active at a neutral pH.

Hydraulic fracturing, which is commonly referred to as fracturing, is a process used to increase the flow of desirable fluids, such as oil and gas, from a portion of a subterranean formation. Hydraulic fracturing operations generally involve introducing a fracturing fluid into a subterranean formation at a pressure sufficient to create or enhance one or more fractures in the formation. Enhancing a fracture includes enlarging a pre-existing fracture (e.g, perforation 130) in the formation. In an embodiment, a composite fluid of the type disclosed herein is a fracturing fluid that may be used to fracture the formation.

Referring to the embodiment of FIG. 1B, once the composite fluid has been created in the zone of fluid communication 119, the composite fluid (e.g., as shown by composite fluid flow arrow 131) may enter the perforations 130 in the casing string 111, and propagate them into fractures 132 that extend into the fracturing interval 1. Additionally or alternatively, in an embodiment, the composite fluid may cause a fracture to form or be extended within the fracturing interval 2.

In an embodiment, a particulate proppant material is suspended in the composite fluid so that it is carried into the created fractures 132 and deposited therein when the flow rate of the fracturing fluid and the pressure exerted on the fractured subterranean formation are reduced. The fractures 132 will tend to close after the pumping of the fracturing fluid is stopped and the pressures are released. To prevent the fracture from closing, the proppant is placed in the fracture 132 to keep the fracture 132 propped open. The proppant holds the fracture 132 open while still allowing fluid flow through the permeability of the proppant particulate. The fracture 132, especially if propped open by a proppant pack, provides an additional flow path for the oil or gas to reach the wellbore, which increases the rate of oil and/or gas production from the well.

While the embodiments of FIGS. 1A and 1B only display two fracturing intervals in the producing zone 107, the producing zone may comprise 1, 2, 3, 4, 5, 6, 7, 8, 9, 10, 11, 12, or more fracturing intervals.

In an embodiment, for example, where the fracturing intervals are to be treated at different times (e.g., 1, 2, 3, 4, 5, 6, 7, 8, 9, 10, 11, 12, or more fracturing intervals), when it is desired to begin treatment of a second fracturing interval, for example, when treatment of a first fracturing interval has been completed, the perforations and/or fractures of the first fracturing interval may be plugged and/or packed off, for example, so as to plug fluid flow into and/or via the first fracturing interval. For example, in an embodiment, one or more of the fluid flowpaths into or via the first fracturing interval may be obstructed by placement of a plug, such as a packer (e.g., a swellable or mechanical packer, such as a fracturing plug) or a particulate plug, such as a sand plug (e.g., by introduction of a concentrated particulate slurry). As such, the flowpaths of the second fracturing interval may be isolated from the flowpaths of the second, third, fourth, etc., fracturing interval.

In an embodiment, the PMT method 2000 may be repeated with respect to each of a second, third, fourth, fifth, sixth, or more, fracturing intervals. Referring to the embodiment of FIG. 2, the PMT method may be optionally repeated for additional treatment 2600 for additional fracturing intervals.

In an embodiment, a wellbore servicing method, such as the PMT method 2000 disclosed herein or some portion thereof, may be an advantageous means by which to treat a subterranean formation. In an embodiment, the methods and compositions disclosed herein may advantageously allow the use of concentrated crosslinked proppant solutions in the wellbore, without having to transport such solutions from the surface into the wellbore. The concentrated crosslinked proppant solutions may form in situ in the wellbore, thus reducing the problems associated with having to transport highly viscous solutions into the subterranean formation (e.g., reduced pipe friction) degradation of the crosslinked system due to sheer, etc.).

Further advantages that may be realized by the compositions and methodologies disclosed herein include the ability to control the concentration of the proppant in the composite fluid downhole, and the ability to suspend the proppant uniformly in a crosslinked fluid. In such embodiments, the crosslinking occurs in situ in the wellbore while the proppant-laden solution is mixing with the other components of the composite fluid. In contrast, this application delays the crosslink from initiating until further down the wellbore, thus the reducing or preventing shear deterioration.

Additional Disclosure

The following are additional enumerated embodiments of the concepts disclosed herein.

A first embodiment, which is a method of servicing a wellbore within a subterranean formation comprising providing a first wellbore tubular positioned within a second wellbore tubular creating a tubular flowpath and an annular flowpath, wherein the tubular flowpath and the annular flowpath converge in a mixing zone within the wellbore; placing an annular fluid through the annular flowpath; placing a tubular fluid through the tubular flowpath; and contacting the annular fluid and the tubular fluid in the mixing zone to form a composite fluid,
wherein the composite fluid comprises a base fluid component, a proppant component, a crosslinkable polymer component, a crosslinking agent component, and an optional buffering agent component, and
wherein the components of the composite fluid are apportioned between the annular fluid and the tubular fluid such that reaction of the components to form the composite fluid is inhibited until the components of the composite fluid mix within the mixing zone.

A second embodiment, which is the method of the first embodiment wherein the tubular fluid and the annular fluid are provided within the wellbore in a volumetric ratio of tubular fluid to annular fluid of from about 1:1 to about 1:10.

A third embodiment, which is the method of the first or second embodiment wherein
(i) the annular fluid comprises the crosslinkable polymer and the tubular fluid comprises the crosslinking agent;
(ii) the annular fluid comprises the crosslinking agent and the tubular fluid comprises the crosslinkable polymer;
(iii) the annular fluid comprises the crosslinkable polymer and the buffering agent and the tubular fluid comprises the crosslinking agent;
(iv) the annular fluid comprises the crosslinking agent and the tubular fluid comprises the crosslinkable polymer and the buffering agent;
(v) the annular fluid comprises the crosslinkable polymer and the crosslinking agent and the tubular fluid comprises the buffering agent;
(vi) the annular fluid comprises the buffering agent and the tubular fluid comprises the crosslinkable polymer and the crosslinking agent;
(vii) the annular fluid comprises the crosslinkable polymer, the buffering agent and at least a first portion of the base fluid and the tubular fluid comprises the crosslinking agent, the proppant, and at least a second portion of the base fluid;
(viii) the annular fluid comprises the crosslinking agent and at least a first portion of the base fluid and the tubular fluid comprises the crosslinkable polymer, the buffering agent, the proppant, and at least a second portion of the base fluid; or
(ix) the annular fluid comprises the crosslinking agent, the crosslinkable polymer and at least a first portion of the base fluid and the tubular fluid comprises the buffering agent, the proppant, and at least a second portion of the base fluid.

A fourth embodiment, which is the method of the third embodiment wherein the base fluid comprises an aqueous fluid, an aqueous gel, a viscoelastic surfactant gel, an oil gel, a foamed gel, an emulsion, an inverse emulsion, or combinations thereof.

A fifth embodiment, which is the method of the third or fourth embodiment wherein the base fluid comprises a fracturing fluid.

A sixth embodiment, which is the method of any of the third through fifth embodiments wherein the base fluid is present in the composite fluid in an amount of from about 30 wt. % to about 100 wt. %, based on the total weight of the composite fluid.

A seventh embodiment, which is the method of any of the first through sixth embodiments wherein the proppant comprises silica (sand), graded sand, Ottawa sands, Brady sands, Colorado sands; resin-coated sands; gravels; synthetic organic particles, nylon pellets, high density plastics, teflons, rubbers, resins; ceramics, aluminosilicates; glass; sintered bauxite; quartz; aluminum pellets; ground or crushed shells of nuts; ground or crushed seed shells; crushed fruit pits; processed wood materials; or combinations thereof.

An eighth embodiment, which is the method of any of the first through seventh embodiments wherein the proppant is present in the composite fluid in an amount of from about 0 wt. % to about 70 wt. %, based on the total weight of the composite fluid.

A ninth embodiment, which is the method of any of the first through eighth embodiments wherein the crosslinkable polymer comprises polysaccharides, starches, cellulose, cellulose ethers, carboxycelluloses, carboxyalkylhydroxyethyl celluloses, hydroxyethylcellulose, hydroxypropylcellulose, carboxymethylhydroxyethylcellulose, carboxymethylcellulose, dextran, substituted or unsubstituted galactomannans, guar gums, hydroxypropyl guar, carboxymethylhydroxypropyl guar, carboxymethyl guar, hydrophobically modified guars, guar-containing compounds, high-molecular weight polysaccharides composed of mannose and galactose sugars, heteropolysaccharides obtained by the fermentation of starch-derived sugar, diutan, scleroglucan, or combinations thereof.

A tenth embodiment, which is the method of any of the first through ninth embodiments wherein the crosslinkable polymer is present in the composite fluid in an amount of from about 0.005 wt. % to about 1 wt. % based on the total weight of the composite fluid.

An eleventh embodiment, which is the method of any of the first through tenth embodiments wherein the crosslinking agent comprises boron-based compounds, zirconium-containing complexes, zirconate, zirconium lactate, aluminum-containing complexes, aluminum sulfate, or combinations thereof.

A twelfth embodiment, which is the method of any of the first through eleventh embodiments wherein the crosslinking agent is present in the composite fluid in an amount of from about 0 of from about 0.1 gal/Mgal to about 10 gal/Mgal.

A thirteenth embodiment, which is the method of any of the first through twelfth embodiments wherein the buffering agent comprises carbonates, potassium carbonate, sodium carbonate, calcium carbonate, bicarbonates, sodium bicarbonate, potassium bicarbonate, phosphates, monosodium phosphate, disodium phosphate, monopotassium phosphate, dipotassium phosphate, ammonium phosphate, diammonium phosphate, citric acid, citrates, acetic acid, magnesium oxide, acetates, borates, or combinations thereof.

A fourteenth embodiment, which is the method of any of the first through thirteenth embodiments wherein the buffering agent is present in an amount of from about 0.5 gal/Mgal to about 10 gal/Mgal.

A fifteenth embodiment, which is the method of any of the first through fourteenth embodiments wherein the composite fluid has a viscosity of from about 250 cP to about 6,000 cP.

A sixteenth embodiment, which is the method of any of the first through fifteenth embodiments wherein the base fluid is water.

A seventeenth embodiment, which is a system for servicing a wellbore within a subterranean formation comprising:
a tubing string positioned within a casing string to provide an annular flowpath and a tubular flowpath;
a first fluid in the tubular flowpath comprises a proppant-laden slurry and a buffering agent;
a second fluid in the annular flowpath comprises an aqueous solution of a crosslinkable polymer and a crosslinking agent; and
a mixing zone disposed within the wellbore proximate to a fracturing interval of the subterranean formation, wherein the first fluid and second fluid are contacted in the mixing zone to form a composite fluid.

An eighteenth embodiment, which is the system of the seventeenth embodiment wherein the proppant-laden slurry comprises sand, the crosslinkable polymer comprises carboxymethylcellulose, and the crosslinking agent comprises a zirconium-based crosslinker.

A nineteenth embodiment, which is the system of the seventeenth or eighteenth embodiment wherein the first fluid is buffered at a pH of about 4.8 and the second fluid has an about neutral pH.

A twentieth embodiment, which is the system of any of the seventeenth through nineteenth embodiments wherein the first fluid has a viscosity of from about 1 cP to about 100 cP and the second fluid has a viscosity of from about 1 cP to about 100 cP.

While embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_L$, and an upper limit, $R_U$, is disclosed, any number falling within the range is specifically disclosed. In particular, the following numbers within the range are specifically disclosed: $R=R_L+k*(R_U-R_L)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the embodiments of the present invention. The discussion of a reference in the Description of Related Art is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:
1. A method of servicing a wellbore within a subterranean formation comprising:
providing a first wellbore tubular positioned within a second wellbore tubular creating a tubular flowpath and an annular flowpath, wherein the tubular flowpath and the annular flowpath converge in a mixing zone within the wellbore;

placing an annular fluid through the annular flowpath;
placing a tubular fluid through the tubular flowpath, the tubular fluid comprising a proppant;
contacting the annular fluid and the tubular fluid in the mixing zone to form a composite fluid,
wherein the composite fluid comprises a base fluid component, the proppant, a crosslinkable polymer component, a crosslinking agent component, and a buffering agent component, and:
- (i) the annular fluid comprises the crosslinkable polymer and the crosslinking agent and does not comprise a buffering agent, and the tubular fluid comprises the buffering agent and does not comprise a crosslinkable polymer or a crosslinking agent;
- (ii) the annular fluid comprises the buffering agent and does not comprise a crosslinkable polymer or a crosslinking agent, and the tubular fluid comprises the crosslinkable polymer and the crosslinking agent and does not comprise a buffering agent;
- (iii) the annular fluid comprises the crosslinkable polymer and the buffering agent and does not comprise a crosslinking agent, and the tubular fluid comprises the crosslinking agent and a crosslinkable polymer and does not comprise a buffering agent; or
- (iv) the annular fluid comprises the crosslinkable polymer and the crosslinking agent and does not comprise a buffering agent, and the tubular fluid comprises the crosslinkable polymer and the buffering agent and does not comprise a crosslinking agent; and allowing the crosslinking agent to interact with the crosslinkable polymer component in the presence of the buffering agent to form a crosslinked polymer.

2. The method of claim 1, wherein the tubular fluid and the annular fluid are provided within the wellbore in a volumetric ratio of tubular fluid to annular fluid of from about 1:1 to about 1:10.

3. The method of claim 1, wherein the base fluid comprises at least one fluid selected from the group consisting of: an aqueous fluid, an aqueous gel, a viscoelastic surfactant gel, an oil gel, a foamed gel, an emulsion, an inverse emulsion, and any combinations thereof.

4. The method of claim 1, wherein the base fluid comprises a fracturing fluid.

5. The method of claim 1, wherein the base fluid is present in the composite fluid in an amount of at least about 30 wt. % based on the total weight of the composite fluid.

6. The method of claim 1, wherein the proppant comprises at least one material selected from the group consisting of: silica, sand, gravels; synthetic organic particles, nylon pellets, high density plastics, rubbers, resins; ceramics, aluminosilicates; glass; sintered bauxite; quartz; aluminum pellets; ground or crushed shells of nuts; ground or crushed seed shells; crushed fruit pits; processed wood materials; and any combination thereof.

7. The method of claim 1, wherein the proppant is present in the composite fluid in an amount of up to about 70 wt. %, based on the total weight of the composite fluid.

8. The method of claim 1, wherein the crosslinkable polymer comprises at least one polymer selected from the group consisting of: a polysaccharide, a starch, a cellulose, a cellulose ether, a substituted or unsubstituted galactomannan, a guar-containing compound, a polysaccharide composed of mannose and galactose sugars, a heteropolysaccharide obtained by the fermentation of starch-derived sugar, diutan, scleroglucan, and any combination thereof.

9. The method of claim 1, wherein the crosslinkable polymer is present in the composite fluid in an amount of from about 0.005 wt. % to about 1 wt. % based on the total weight of the composite fluid.

10. The method of claim 1, wherein the crosslinking agent comprises at least one compound selected from the group consisting of: a boron-based compound, a zirconium-containing complex, zirconate, zirconium lactate, an aluminum-containing complex, aluminum sulfate, and any combination thereof.

11. The method of claim 1, wherein the crosslinking agent is present in the composite fluid in an amount of from about 0.1 gal/Mgal to about 10 gal/Mgal.

12. The method of claim 1, wherein the buffering agent comprises at least one compound selected from the group consisting of: a carbonate, a bicarbonate, a phosphate, citric acid, citrates, acetic acid, magnesium oxide, an acetate, a borate, and any combination thereof.

13. The method of claim 1, wherein the buffering agent is present in an amount of from about 0.5 gal/Mgal to about 10 gal/Mgal.

14. The method of claim 1, wherein the composite fluid has a viscosity of from about 250 cP to about 6,000 cP.

15. The method of claim 1, wherein the base fluid is water.

* * * * *